US006839607B2

(12) United States Patent
Wooten

(10) Patent No.: US 6,839,607 B2
(45) Date of Patent: Jan. 4, 2005

(54) SYSTEM FOR RAPID MANUFACTURING OF REPLACEMENT AEROSPACE PARTS

(75) Inventor: John R. Wooten, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 10/339,449

(22) Filed: Jan. 9, 2003

(65) Prior Publication Data

US 2003/0105538 A1 Jun. 5, 2003

(51) Int. Cl.[7] .......................... G06F 19/00; G06F 17/50
(52) U.S. Cl. ...................... 700/163; 700/98; 700/119; 700/166; 700/182
(58) Field of Search ........................... 700/96, 97, 98, 700/117–120, 159–161, 166, 182, 195, 212, 163

(56) References Cited

U.S. PATENT DOCUMENTS

| | | | |
|---|---|---|---|
| 4,844,144 A | | 7/1989 | Murphy et al. |
| 4,863,538 A | | 9/1989 | Deckard |
| 5,127,037 A | * | 6/1992 | Bynum ........................... 378/4 |
| 5,156,697 A | * | 10/1992 | Bourell et al. ............... 264/497 |
| 5,182,715 A | * | 1/1993 | Vorgitch et al. ............ 700/182 |
| 5,805,289 A | * | 9/1998 | Corby et al. ................. 356/613 |
| 6,073,056 A | * | 6/2000 | Gawronski et al. ........... 700/98 |
| 6,159,411 A | | 12/2000 | Kulkarni et al. |
| 6,165,406 A | * | 12/2000 | Jang et al. ................... 264/308 |
| 6,180,050 B1 | * | 1/2001 | Arai et al. ................... 264/401 |
| 6,450,393 B1 | * | 9/2002 | Doumanidis et al. ..... 228/110.1 |
| 6,647,308 B1 | * | 11/2003 | Prejean ....................... 700/117 |
| 2002/0166220 A1 | * | 11/2002 | Imundo et al. ........... 29/402.09 |

FOREIGN PATENT DOCUMENTS

DE 19854275 A1 * 5/2000 ........... G07F/17/00

* cited by examiner

Primary Examiner—Paul Rodriguez
(74) Attorney, Agent, or Firm—William Anderson, Esq.

(57) ABSTRACT

An method for the rapid manufacturing of aerospace replacement parts 100 is provided, including removing an in-service aerospace part from an aerospace system 120. The present invention further includes placing the in-service aerospace part into a three-dimensional scanning device 130. The invention then scans the in-service aerospace part utilizing the three-dimensional scanning device to develop a three-dimensional scan 140. A computer-aided-design model is then developed based on the three-dimensional scan 150. The invention then direct metal fabricates a replacement aerospace part from the computer-aided-design model utilizing layer-build technology device 170. Finally the replacement aerospace part is installed back into the aerospace system 180.

11 Claims, 1 Drawing Sheet

SYSTEM FOR RAPID MANUFACTURING OF REPLACEMENT AEROSPACE PARTS

TECHNICAL FIELD

The present invention relates generally to an apparatus and method for the rapid manufacturing of replacement parts for aging systems, such as, for aerospace or military applications, and more particularly to an apparatus and method for the manufacturing of small-lot aerospace and military grade replacement parts without the cost and extensive lead-time associated with the development and manufacturing of tooling.

BACKGROUND OF THE INVENTION

Aerospace and military applications often provide unique challenges to design and manufacturing. The nature of these applications often requires limited run and small-lot productions that result in high cost because of the small quantity of individualized assemblies. Part cost can be extremely expensive due to the cost of tooling and long lead-time associated with developing and fabricating the tooling. If these costs are associated with initial build, they are even more prevalent in dealing with replacement parts for aging aircraft and military applications.

Replacement parts for aging aircraft and other systems commonly arise where the tooling that produced the original parts is no longer in existence. Additionally, the parts "as designed" may not in fact interface correctly into the existing systems. When this situation arises, a complete redesign of part layout and tooling may be required at considerable expense. In addition, where original tooling is no longer available, redevelopment and fabrication of tooling is often required. This can result in undesirable costs associate with supply of the replacement parts. Also, on occasion, it may be necessary to build more parts than are actually needed to help amortize the costs of the tooling. This, however, can result in large inventory costs that counter the cost savings associated with the larger production runs.

What is needed is a cost effective and productive method of supplying replacement parts in limited runs without the negative costs associated with the redevelopment of specialized tooling. Additionally, it would be highly desirable to have a method of supplying replacement parts that addressed the problems associated with in-service parts no longer matching original design specifications. If such a system were developed it would eliminate the costs associated with specialized tooling, long lead time development, and large inventory.

SUMMARY OF THE INVENTION

It is therefore an object to the present invention to provide an apparatus and method for the rapid manufacturing of aerospace replacement parts that provides relief from the costs and long lead-time associated with the development and fabrication of tooling. It is further object to the present invention to provide an apparatus and method for the rapid manufacturing of aerospace replacement parts that would address small lot productions and components that no longer match original design configurations.

In accordance with the objects of the present invention a method for the rapid manufacturing of aerospace replacement parts is provided. The method includes removing an in-service aerospace part from an aerospace system. The in-service aerospace part is placed into a three-dimensional scanning device. The present invention further includes scanning the in-service aerospace part. The present invention then develops a computer-aided-design model based on the three-dimensional scan. The present invention finally includes direct metal fabricating a replacement part from the computer-aided-design model utilizing a layer-build technology device.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
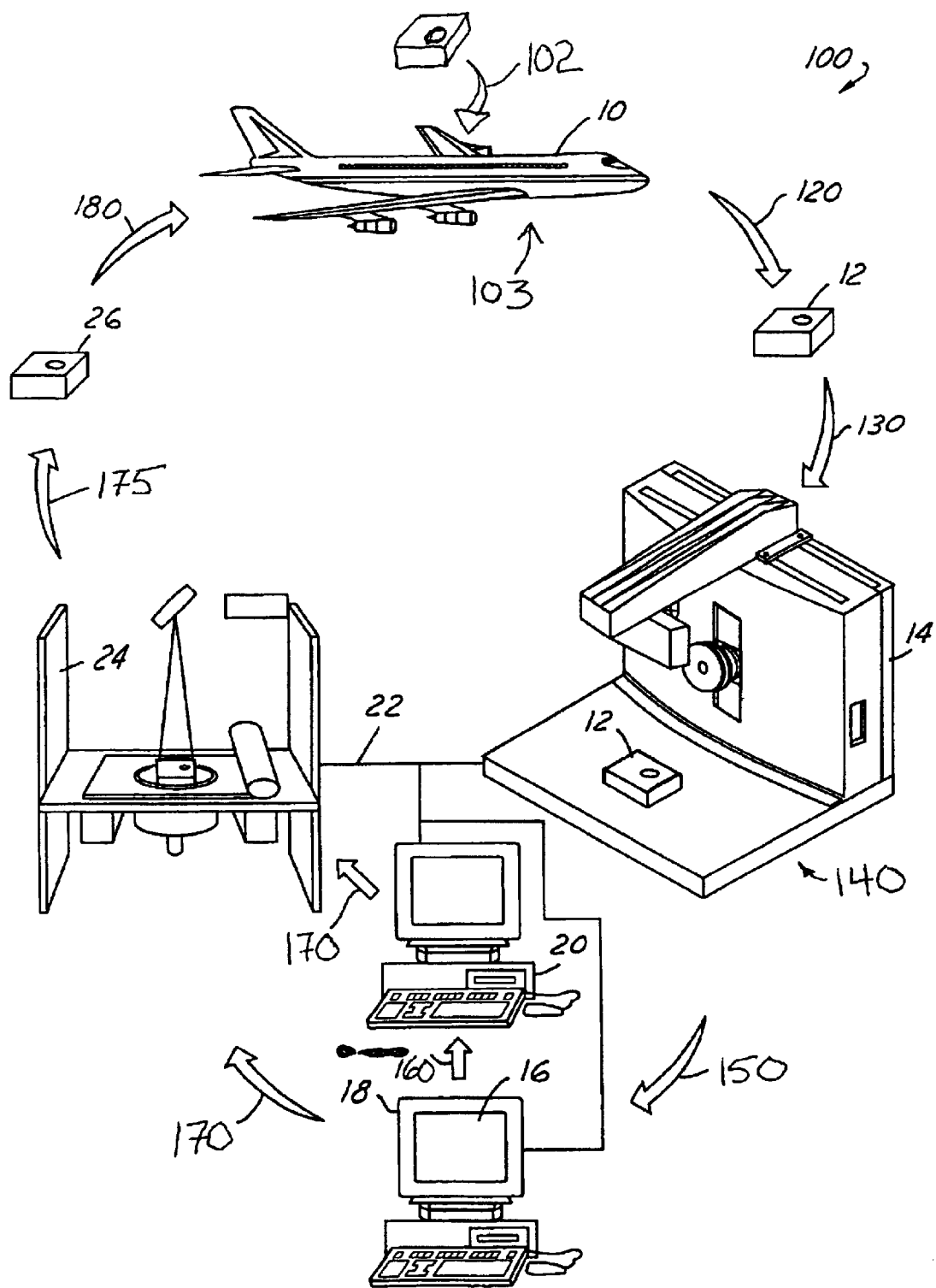
FIG. 1 is an illustration of a method for the rapid manufacturing of aerospace replacement parts in accordance with the present invention.

Referring now to FIG. 1, which is an illustration of a method 100 for the rapid manufacturing of aerospace replacement parts in accordance with the present invention. The method 100 includes removing 120 an in-service aerospace part from an aerospace system. It is contemplated that the aerospace system 10 can encompass a wide variety of aircraft and military applications. Similarly the in-service aerospace part 12 is intended to encompass any number of components within the aircraft 10. Although a variety of in-service aerospace parts 12 are contemplated, one embodiment contemplates the removal of metal components from the aircraft. The nature of many in-service aerospace parts 12 within an aircraft 10 is such that after continuous use within the aerospace system 10 they can become worn or adapt to their surroundings. Thus the aerospace system 10 as a whole can adjust to the point that parts as originally designed may not fit or properly function. Thereby inserting 102 a part into the aerospace system 10 and operating 103 that system until the part is modified, generates an in-service aerospace part 12. In other circumstances, the in-service aerospace parts 12 may have been modified over the years without correlating changes made to the design specifications. In these, as well as other circumstances, remanufacture of the part to design specifications may be inadequate as well as too costly.

The present invention addresses these scenarios by placing the 130 in-service part within a three-dimensional scanning device 14. A variety of three-dimensional scanning devices 14 are contemplated for use with the present invention. The three-dimensional scanning device 14 may include, but is not limited to, computed-tomography scanners, laser scanners, and touch probe scanners. The thee-dimensional scanning device 14 allows for a complete mapping of the in-service aerospace part 12 removed from the aircraft 10. The invention includes scanning 140 the in-service aerospace part. It is contemplated that the results of the scanning device 14 may be raw data or they may take the form of an electronic drawing. Both of these can be referred to as a three-dimensional scan.

The raw data or electronic drawings are then utilized to develop 150 a computer-aided-design model based on the three-dimensional scan. It is contemplated the computer-aided design (CAD) model 16 may take on a variety of formats including, but not limited to, formats such as ProE, CATIA, or UniGraphics. Similarly, although the development of a CAD model 16 can be performed on a variety of systems, one embodiment contemplates the use of a workstation 18. An optional step of performing analysis 160 to refine the computer-aided design model may be performed. It is contemplated that the analysis 20 may include and analysis and design modifications necessary to insure the design is suitable for functioning within the aerospace system 10. Traditional engineering and design methodologies are contemplated for use within this analysis. Although the analysis may be performed 160 on the same system or workstation 18 as the CAD model 16 development, it is also contemplated that the analysis may be performed on a remote workstation 20 within the replacement part system network 22.

The present invention therein direct-metal fabricates 170 a replacement aerospace part from the computer-aided-design model utilizing a layer-build technology device. Although the layer-build technology device 24 may include a variety of manufacturing devices, one embodiment contemplates the use of a selective laser-sintering device. The selective laser-sintering device is capable of producing metal replacement aerospace parts 26 from the CAD model 16. Although a selective laser-sintering device is preferably, other manufacturing devices such as stereolithography devices. Furthermore, it is contemplated that the step of fabricating 170 from the CAD model is intended to include any intermediary steps such as conversion of the CAD model 16 into a format or file usable by the layer-build technology device 24 such as a stereolithography file.

Finally the present invention includes removal 175 of the part from the layer-build technology device 24 and installation 180 of the replacement aerospace part back into the aircraft. The present invention, therefore, allows replacement parts to be replaced without the large inventory costs, excessive tooling costs and time, or non-fit scenarios associated with present methods. This provides a great benefit to aircraft 10 and military applications wherein the small number and uniqueness of in-service parts 12 make their replacement difficult and costly.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method for the rapid manufacturing of aerospace replacement parts comprising:

inserting a part into an aerospace system;

operating said aerospace system until said part is modified, said part becoming an in-service aerospace part;

removing said in-service aerospace part from an aerospace system;

placing said in-service aerospace part into a three-dimensional scanning device;

scanning said in-service aerospace part utilizing said three-dimensional scanning device to develop a three-dimensional scan;

developing a computer-aided-design model based on said three-dimensional scan;

direct metal fabricating a replacement aerospace part from said computer-aided-design model utilizing layer-build technology device; and installing said replacement aerospace part in said aerospace system.

2. A method as described in claim 1, wherein said scanning utilizing said three-dimensional scanning device comprises performing a computed-tomography scan utilizing a computed-tomography scanner.

3. A method as described in claim 1, wherein said scanning utilizing said three-dimensional scanning device comprises performing a laser scan utilizing a laser scanner.

4. A method as described in claim 1, wherein said scanning utilizing said three-dimensional scanning device comprises performing a touch probe scan utilizing a touch probe scanner.

5. A method as described in claim 1, further comprising:

performing analysis to refine the computer-aided design model.

6. A method as described in claim 5, wherein said analysis comprises modification of the computer-aided design model.

7. A method as described in claim 1, wherein said direct metal fabricating comprises selective laser sintering.

8. A method as described in claim 1, further comprising comprising:

transferring said three-dimensional scan and said computer-aided-design model through a network.

9. A method as described in claim 1, further comprising:

converting said computer-aided-design model into a stereolithography file.

10. An apparatus for the rapid manufacturing of aerospace replacement parts comprising:

a three-dimensional scanning device for scanning an in-service aerospace part, said in-service aerospace part having been operated within an aerospace system until modified, said three-dimensional scanning device developing a three dimensional scan;

a computer-aided-design workstation networked to said three-dimensional scanning device, said computer-aided-design workstation developing a computer-aided-design model from said three-dimensional scan; and a selective laser sintering station networked to said computer-aided-design workstation, said selective laser sintering station generating a replacement aerospace part corresponding to said in-service aerospace part.

11. An apparatus as described in claim 10 further comprising: an analysis workstation networked to said computer-aided-design workstation, said analysis workstation modifying said computer-aided-design model.

* * * * *